United States Patent
Wiley et al.

(10) Patent No.: US 7,526,806 B2
(45) Date of Patent: Apr. 28, 2009

(54) METHOD AND SYSTEM FOR ADDRESSING INTRUSION ATTACKS ON A COMPUTER SYSTEM

(75) Inventors: Kevin L. Wiley, Elgin, TX (US);
Michael L. Hall, Austin, TX (US);
Gerald S. Lathem, Elgin, TX (US);
Robert E. Gleichauf, San Antonio, TX (US)

(73) Assignee: Cisco Technology, Inc., San Jose, CA (US)

( * ) Notice: Subject to any disclaimer, the term of this patent is extended or adjusted under 35 U.S.C. 154(b) by 902 days.

(21) Appl. No.: 10/701,653

(22) Filed: Nov. 5, 2003

(65) Prior Publication Data

US 2005/0097339 A1   May 5, 2005

(51) Int. Cl.
*G06F 11/30* (2006.01)
(52) U.S. Cl. ............................. 726/23; 726/25; 713/188
(58) Field of Classification Search ............... 726/22–25
See application file for complete search history.

(56) References Cited

U.S. PATENT DOCUMENTS

| | | | |
|---|---|---|---|
| 6,301,668 B1 | 10/2001 | Gleichauf et al. | 713/201 |
| 6,415,321 B1 | 7/2002 | Gleichauf et al. | 709/224 |
| 6,499,107 B1 | 12/2002 | Gleichauf et al. | 713/201 |
| 6,609,205 B1 * | 8/2003 | Bernhard et al. | 726/22 |
| 6,816,973 B1 * | 11/2004 | Gleichauf et al. | 726/13 |
| 6,895,383 B2 | 5/2005 | Heinrich | 705/7 |
| 6,952,779 B1 * | 10/2005 | Cohen et al. | 726/22 |
| 7,281,270 B2 * | 10/2007 | Piesco et al. | 726/25 |
| 2002/0147803 A1 | 10/2002 | Dodd et al. | 709/223 |
| 2003/0093514 A1 * | 5/2003 | Valdes et al. | 709/224 |
| 2003/0154393 A1 * | 8/2003 | Young | 713/200 |
| 2004/0073810 A1 * | 4/2004 | Dettinger et al. | 713/201 |
| 2004/0143753 A1 * | 7/2004 | Hernacki et al. | 713/200 |
| 2005/0086522 A1 * | 4/2005 | Rowland | 713/201 |
| 2005/0193430 A1 * | 9/2005 | Cohen et al. | 726/25 |
| 2006/0010493 A1 * | 1/2006 | Piesco et al. | 726/23 |

OTHER PUBLICATIONS

Eric W. Weisstein. "floor function" CRC Concise Encyclopedia of Mathematics. 1999. CRC Press LLC. p. 655.*
PCT Notification of Transmittal of the International Search Report and the Written Opinion of the International Searching Authority, or the Declaration, International Application No. PCT/US04/33311; Cisco Technology, Inc.; 10 pages, Mar. 14, 2006.

* cited by examiner

*Primary Examiner*—Christian LaForgia
(74) *Attorney, Agent, or Firm*—Baker Botts L.L.P.

(57) ABSTRACT

According to one embodiment of the invention, a computerized method for addressing intrusion attacks directed at a computer includes receiving a data stream corresponding to a potential attack on the computer and calculating an event risk rating for the data stream. Calculating the event risk rating includes determining at least one component risk rating. In one embodiment, the component risk ratings are: a signature fidelity rating indicative of the likelihood the potential attack will affect the computer in the absence of knowledge regarding the computer, an attack relevance rating indicative of the relevance of the potential attack to the computer, and a target value rating indicative of the perceived value of the computer. The method also includes responding to the potential attack based on the calculated risk rating.

25 Claims, 2 Drawing Sheets

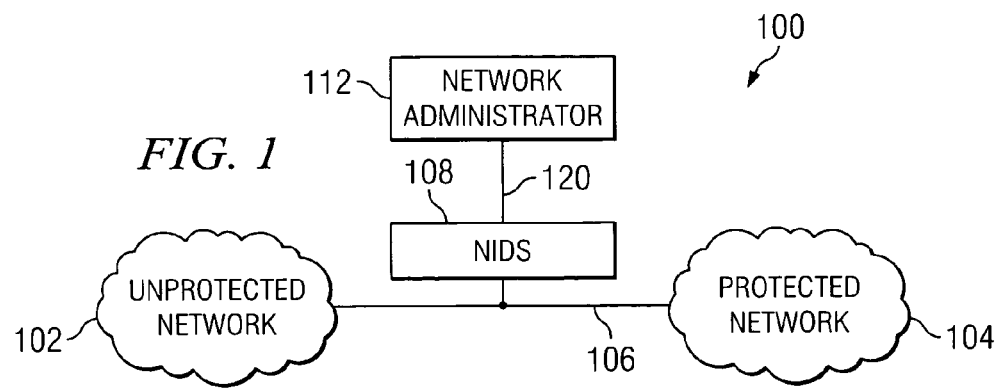
FIG. 1
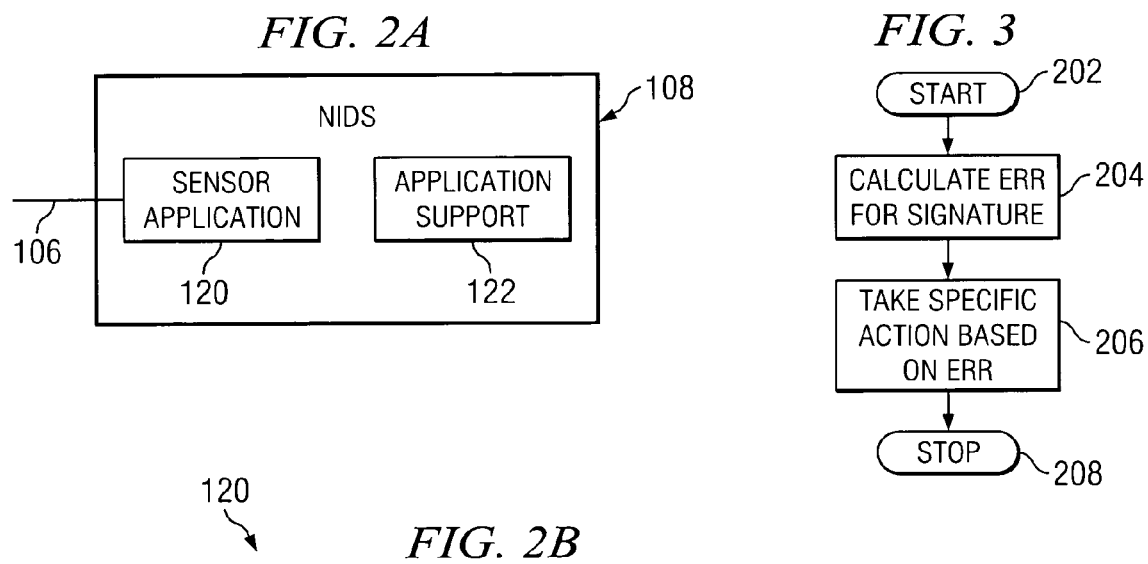
FIG. 2A
FIG. 3
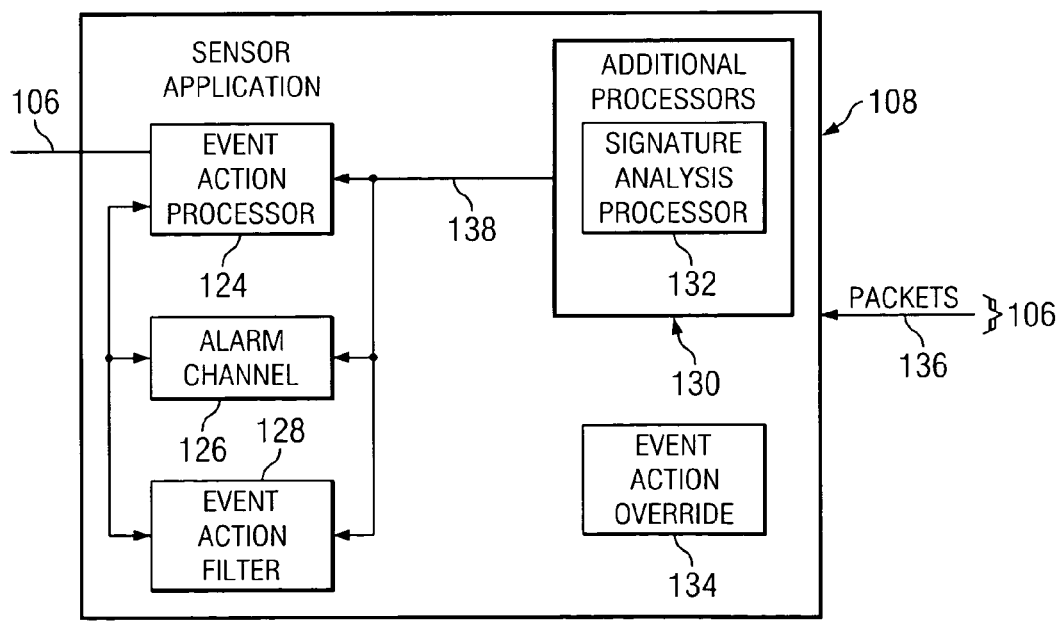
FIG. 2B

METHOD AND SYSTEM FOR ADDRESSING INTRUSION ATTACKS ON A COMPUTER SYSTEM

TECHNICAL FIELD OF THE INVENTION

This invention relates generally to intrusion detection and, more particularly, to a method and system for addressing intrusion attacks on a computer system.

BACKGROUND OF THE INVENTION

Network Intrusion Detection Systems ("NIDS") are typically designed to monitor network activity in real-time to spot suspicious or known malicious activity and to report these findings to the appropriate personnel. By keeping watch on all activity, NIDS have the potential to warn about computer intrusions relatively quickly and allow administrators time to protect or contain intrusions, or allow the NIDS to react and stop the attack automatically.

As the market for intrusion detection moves toward maturity it begins to demand intrusion prevention. Current technology does not allow for foolproof application of blocking policies based on signature detection alone. In order for customers to apply prevention policies based on detection of potential malicious activity on the network, the issue of false positives or benign triggers must be addressed. False positives may occur, for example, when a known signature is detected but that signature has no potential impact on a particular computer system.

SUMMARY OF THE INVENTION

According to one embodiment of the invention, a computerized method for addressing intrusion attacks directed at a computer includes receiving a data stream corresponding to a potential attack on the computer and calculating an event risk rating for the data stream. Calculating the event risk rating includes determining at least one component risk rating. In one embodiment, the component risk ratings are: a signature fidelity rating indicative of the likelihood the potential attack will affect the computer in the absence of knowledge regarding the computer, an attack relevance rating indicative of the relevance of the potential attack to the computer, and a target value rating indicative of the perceived value of the computer. The method also includes responding to the potential attack based on the calculated risk rating.

Some embodiments of the invention provide numerous technical advantages. Other embodiments may realize some, none, or all of these advantages. For example, according to one embodiment, an event risk rating is calculated that takes into account factors other than just the potential severity of an attack. Thus, the actual risk of an attack can be more accurately assessed, allowing prioritization of the allocation of resources in addressing attacks. Furthermore, policies for responding to attacks may be implemented that are based on the level of the event risk rating, allowing discrimination in responding to various attacks.

Other advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, and which:

FIG. 1 is a schematic diagram illustrating a system for addressing intrusion attacks on a computer system according to one embodiment of the invention;

FIG. 2A is a block diagram illustrating various functional components of the intrusion detection system of FIG. 1;

FIG. 2B is a block diagram illustrating various functional components of the sensor application portion of the intrusion detection system of FIG. 2A;

FIG. 3 is a flowchart showing a method for addressing intrusion attacks on a computer system;

DETAILED DESCRIPTION OF EXAMPLE EMBODIMENTS OF THE INVENTION

Figure 4A:
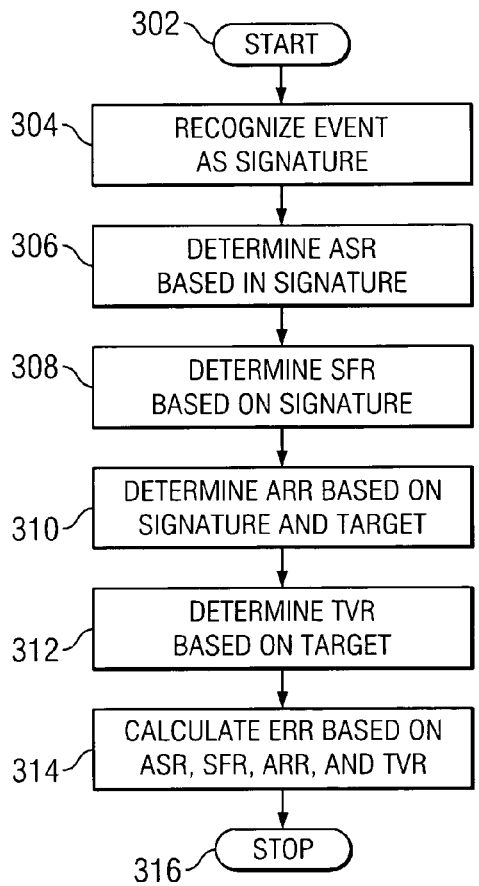
FIG. 4A is a flowchart illustrating a method for determining an event risk rating for any given attack on a computer network according to the teachings of the invention.

Embodiments of the invention are best understood by referring to FIGS. 1 through 5B of the drawings, like numerals being used for like and corresponding parts of the various drawings.

FIG. 1 is a schematic diagram illustrating a computer system 100 that may benefit from the teachings of the invention. In the illustrated embodiment, system 100 includes an intrusion detection system ("NIDS") 108 coupled to a link 106 that communicatively couples an unprotected network 102 with a protected network 104, and a link and a network administrator 112. NIDS 108 may be coupled to unprotected network 102 and protected network 104 in a "parallel" fashion, as shown, or may be converted according to other topologies, such as in an "in-line" fashion.

Unprotected network 102 may be any suitable network external to protected network 104. An example of unprotected network 102 is the Internet. Protected network 104 may be any suitable network, such as a local area network, wide area network, virtual private network, or any other suitable network desired to be secure from unprotected network 102. Protected network may include one or more computers for which protection from attacks is sought. Link 106 couples unprotected network 102 to protected network 104 and may be any suitable communications link or channel. In one embodiment, communications link 106 is operable to transmit data in "packets" between unprotected network 102 and protected network 104; however, communications link 106 may be operable to transmit data in other suitable forms.

NIDS 108 may be any suitable network-based intrusion detection system operable to analyze data packets transmitted over communications link 106 in order to detect any potential attacks on protected network 104. NIDS 108 may be any suitable combination of hardware, firmware, and/or software. Generally, network intrusion detection systems include one or more sensors having the ability to monitor any suitable type of network having any suitable data link protocol. In addition, some network intrusion detection systems are passive observers of network traffic and do not have their own network address.

In a particular embodiment of the invention, sensors associated with NIDS 108 are operable to examine data packets on an IP ("Internet Protocol") network using any suitable protocol, such as TCP ("Transmission Controlled Protocol"), UDP ("User Datagram Protocol"), and ICMP ("Internet Controlled Message Protocol"). Upon detection of a possible attack on protected network 104, NIDS 108 is operable to classify the potential attack as one of many known signatures for attacks. Such classification allows determination of characteristics of a given attack and appropriate responses.

Traditionally, a severity rating may be ascribed to any given attack based upon the potential worst case scenario for that particular type of attack. This ascribing of a severity level to a particular attack allowed some prioritization of network administrator's 112 time as well as computer resources in addressing the attack. However, it has been found that such a severity rating does not provide sufficient levels of precision. According to the teachings of the invention, NIDS 108 generates an event risk rating for each potential attack based upon one or more criteria that take into account factors other than (in addition to) the potential severity of the particular signature. Such an event risk rating may then be used by NIDS (or other devices) to determine an appropriate response to the potential attack. For example, a set of policies may be prescribed based upon the event risk rating. These policies would determine what remedial action NIDS 108 (or some other device) may take, as described in greater detail below.

Network administrator 112 may be any suitable personnel that receives information from NIDS 108 in order to monitor potential attacks on protected network 104 and additionally respond thereto, if appropriate.

FIG. 2A is a block diagram of NIDS 108 illustrating its major functional components. NIDS 108 includes a sensor application 120 and an application support block 122. The majority of the functions of NIDS 108 directly associated with sensing and responding to a potential attack on a computer within protected network 104 are performed by sensor application 120. Application support block 122 provides ancillary applications associated with the functions of sensor application 120. Examples of these ancillary functions include providing web server, CLI, and NAC capabilities.

FIG. 2B is a block diagram illustrating additional detail of sensor application 120. Sensor application 120 includes, in one embodiment, an event action processor 124, an alarm channel 126, an event action filter 128, additional processors 130, including a signature analysis processor 132, and an event action override block 134. Sensor application 120 may receive packets 136, or other types of data streams, over link 106. Packets 136 are received by signature analysis processor 132, which determines the signature of the event associated with packets 136. "Event" refers to the potential attack embedded within, in this example, packets 136. "Signature" refers to the type of attack of the event. This detected signature is provided to event action processor 124 as well as alarm channels 126 and event action filter 128, as designated by reference numeral 138. As described in greater detail below, based upon an event risk rating ascribed to the detected event, particular actions may be taken by event action processor. These actions may include communication over line 106 to protected network 104.

Event action processor 124 is operable to take a variety of actions associated with various types of attacks. In one example such actions may include Reset TCP flow, IP Log, Deny Packet, Deny Flow, Deny Attacker, Shun Host, Shun Connection, Generate SNMP Trap, and Capture Trigger Packet. These types of activities are well known in the field of computer security.

Certain processors within additional processors 130 can call signature micro engine analysis functions, commonly referred to as inspectors, to perform signature analysis. These inspectors can communicate with alarm channel 126 to produce event alerts as necessary.

Alarm channel 126 is responsible for processing such events and generating event alerts associated with detected signatures.

According to the teachings of the invention, event action filter 128, event action processor 124, or alternatively other components of sensor application 120, generate an event risk rating based upon one or more of a plurality of criteria that allows more precise remedial action to be taken in response to an attack on a computer associated with protected network 104. This rating is provided to event action filter 128 and event action override block 134.

As described in greater detail below, event action filter 128 implements policies that are based upon the value of the event risk rating that affect which actions event action processor 124 take in response to the attack. Similarly, event action override 134 implements override policies associated with such activities.

FIG. 3 is a flowchart illustrating a method for responding to intrusion detection attacks. The method begins at step 200. At a step 202 an event risk rating is calculated for a detected event. Details of one example of how to generate such an event risk rating is described in greater detail below in conjunction with FIGS. 4A and 4B. At step 206 specific action is taken based upon the calculated event risk rating for the detected event. For example, if the event risk rating is determined to be very high (meaning a high risk), the packet may be dropped as well as the flow of traffic, but with no notification given. Because of the high risk no interaction is required to perform these actions. The method concludes at step 208.

Figure 4B:
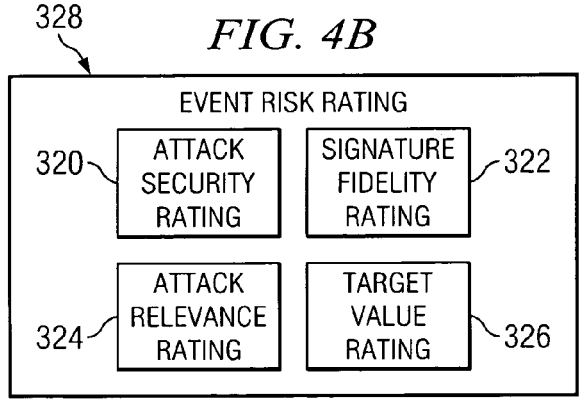
FIG. 4B is a block diagram pictorially illustrating components of an event risk rating according to the teachings of the invention.

FIG. 4A is a flowchart illustrating additional details of one example method for generating an event risk rating. FIG. 4B illustrates components of an event risk rating according to the teachings of the invention. The method begins at step 302. At step 304 a potential attack is detected and recognized as a signature by sensor application 120 and according to one embodiment, signature analysis processor 132. The remaining acts in FIG. 4 may be performed by software or hardware residing in event action processor 124 or alarm channel 126, or alternatively may be performed in other portions of sensor application 120, by a stand-alone processor, or by other processors and memory that may be used for such functions. At step 306, an attack severity rating 320 is calculated for the detected event. The attack severity rating is a measure of how bad an attack will be if it is successful. In one embodiment, the attack severity rating may be one of four possible integers: 25, 50, 75, 100, corresponding to predetermined qualitative assessments of the signature of informational, low, medium, and high, respectively. However, other suitable ratings systems may be used. Thus based upon the anticipated severity level of an attack, if successful, a numerical attack severity rating is generated for the recognized signature.

At step 308, a signature fidelity rating 322 is generated. Signature fidelity rating 322 is a weight associated with how well the signature associated with the detected event might perform in the absence of specific knowledge of the target computer. For example, particular signatures may affect only a very small percentage of operating systems and would have no harmful effect on others. In such a case, the signature fidelity rating would be relatively low. The signature fidelity rating for any given signature may be predetermined by an author of the signature, or may be determined according to other techniques. According to one particular embodiment, the allowable values are from zero to one hundred, with zero indicating that the signature will not apply to any computers and one hundred indicting that the signature definitely will affect all computers. In one embodiment, the factors that may be used to assign a signature fidelity rating to a particular signature may include: dependencies that the vulnerability being exploited has on the operating system of the target computer, which is expressed as an operating system relevancy rating ("OSRR"), service availability (service relevancy rating ("SRR")), service application (service application relevancy rating ([SARR])), and service application version (service application version relevancy rating ("SAVRR")) of the target.

According to one embodiment each of these factors is weighed from 0.95 to 1.0. Additionally an arbitrary general signature quality rating ("SQR") based on the signature author's past experiences with signatures of this type is weighted from zero to one. When assigning this value the author should assume that the target is a vulnerable system and should base the decision on how likely they feel that this signature is to misfire in the presence of normal network traffic. In one embodiment, the above four deterministic scaling factors will always be given a value of 0.95 for the information associated when the factor would improve the confidence level in the signature, 1.0 if it is known how the information would affect fidelity, and 1.0 if the fidelity is not increased with the information. The resulting formula for the signature fidelity rating in one embodiment is as follows:

$$SFR = OSRR \times SRR \times SARR \times SAVRR \times SQR \times 100$$

As an example, if a developer were to create a new signature for the "FOO" reconnaissance activity that was operating system independent and service independent, and the technique being used to identify the activity had roughly a twenty-five percent probability of misfiring, the signature fidelity rating for the signature would be calculated as $(1 \times 1 \times 1 \times 1 \times 0.75) \times 100 = 75$.

If the signature being developed were for the "BAR" buffer overflow, which is operating system dependent, associated with a particular service, but many of the service applications that were employed were based off of the same vulnerable code base so that application and application version were not factors, and the developer felt that the technique being used had less than one percent probability of misfiring the calculated SFR would be: $(0.95 \times 0.95 \times 1.0 \times 1.0 \times 0.99) \times 100 = 89$.

At step 310 an attack relevance rating 324 is determined. Attack relevance rating 324 is a weight representing the correlation of the necessary system requirements for successful exploitation and the knowledge of those with respect to the target system. The determination of the attack relevance rating 324 involves knowledge of information regarding the potential target. This knowledge might be gained through either passive learning or from import of active scan data from the target computer. In one embodiment, the relevant information is the target operating system, the target service availability, the target application running at the service port, and the version of the application running at the target service port (TOSR, TSR, TSAR, and TSAVR, respectively). The formula used to calculate the ARR is as follows:

$$ARR = TOSR \times TSR \times TSAR \times TSAVR \times 100.$$

According to one embodiment, the ARR can have a value ranging from seventy-seven to one hundred twenty-seven to allow for upgrading/downgrading of the overall event risk rating. The values assigned to the point ratings in one embodiment are as given in the table below; however, other values may also be used:

| Correlation knowledge | TOSR | TSR | TSAR | TSAVR |
|---|---|---|---|---|
| Correlates | 1.1 | 1.05 | 1.05 | 1.05 |
| No information available | 1 | 1 | 1 | 1 |
| Does not correlate | .9 | .95 | .95 | .95 |

At step 312 a target value rating 326 is determined. The target value rating is a weight associated with the perceived value of the target. Thus a higher priority will be given to important computers at which attacks are directed than to lesser important computers. Target value rating 326 is intended to allow the user to develop a security policy that is more stringent for "valuable" corporate resources and perhaps looser for less important resources. It also allows for the possible introduction of quality of service like functionality for sensor application 120 when it is under load. Sensor 120 could give deep packet inspection preference to targets with a higher value rating for instance when under heavy load, allowing targets under a given target value rating to pass through uninspected until the loading allows for inspection to resume.

In one embodiment, target value rating 326 can have a point value from ninety to one hundred and ten. According to one embodiment the target rating may take the various values shown in the below table; however, other values may also be used.

| Target Value Rating | Target Value Point Value |
|---|---|
| None | 90 |
| Low | 95 |
| Medium | 100 |
| High | 105 |
| Mission Critical | 110 |

At step 314, an event risk rating 328 is calculated based upon attack severity rating 320, signature fidelity rating 322, attack relevance rating 324, and target value rating 326. In one embodiment, the formula utilized for this calculation is:

$$ERR = \text{floor}(((ASR)*(SFR)*(ARR)*(TVR))/1000000, 100).$$

The method concludes at step 316.

Although a particular technique for calculating the event risk rating is illustrated, other alternatives can be utilized. For example, instead of utilizing all four of the component risk factors, merely one or a subset of four may be used.

Figure 5A:
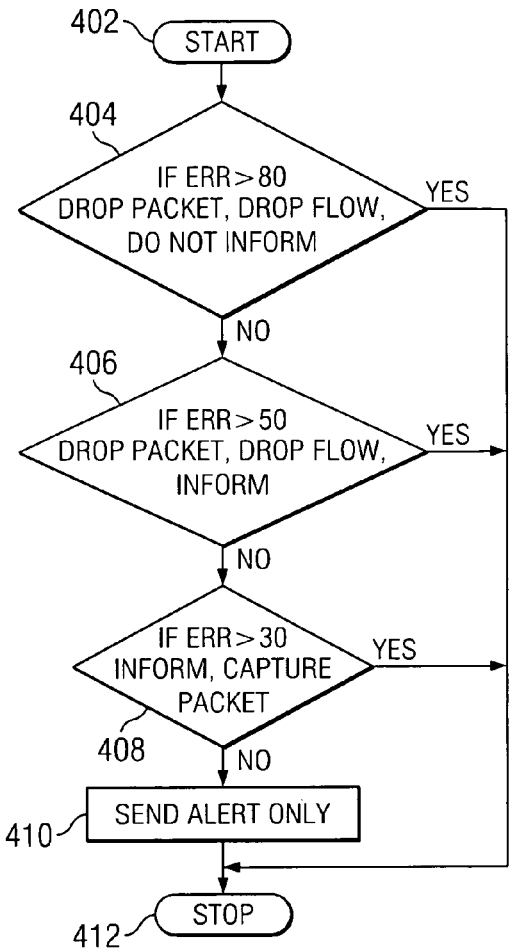
FIG. 5A is a flowchart illustrating example event action policies that may be based upon the calculated event risk rating of FIG. 4.

FIG. 5A is a flowchart illustrating example event action policies that may be implemented based upon the value of the event risk rating generated according to FIG. 4. This flowchart merely shows one set of example policies; however, any suitable set of policies may be implemented based upon the event risk rating 328. The method begins at step 402. If event risk rating 328 is above a certain number, such as eighty in this example, then action processor 124 drops the associated packets, drops the data flow and does not inform the work administrator of these activities. If however, the event risk rating is less than eighty but greater than fifty, then at step 406 the flow is dropped, but the network administrator 112 is informed. Alternatively, if the event risk rating is less than fifty but greater than thirty, then at step 408 the network administrator is informed of the possible attack and the corresponding packets are captured but no other action is taken. Finally, if the event risk rating is less than thirty then only an alert is sent. The method concludes at step 412.

Thus based upon the value of event risk rating 328, certain policies can be set in place for responding to events having a particular severity rating. These policies may be implemented by event action filter 128, or through other suitable programming.

Figure 5B:
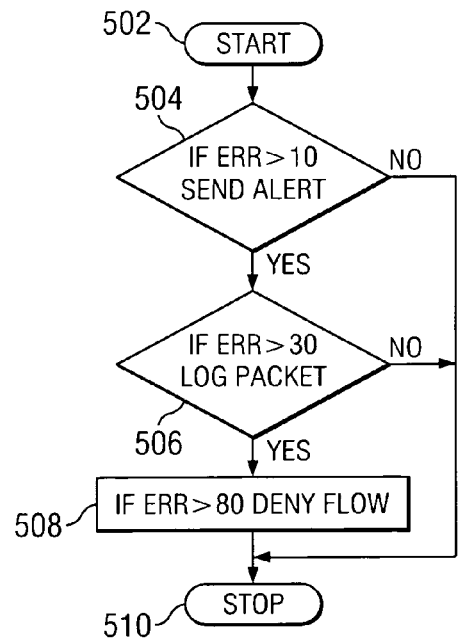
FIG. 5B is a flowchart illustrating example event action overrides based upon the value of the event risk rating of FIG. 4.

FIG. 5B is a flowchart illustrating example steps associated with event action overrides in response to a determination of a particular event risk rating according to FIG. 3. These steps may be performed by event action override block 134 or through other suitable programming. A particular example is provided; however, other suitable overrides based on the value of event risk rating 328 may be implemented. The method begins at step 502. At step 504 a determination is made of whether the event risk rating is greater than ten. If so, then an alert is sent. At step 506 an additional determination is made of whether the event risk rating is greater than thirty, in this example. If so the associated packet is logged. At step 508, an additional determination is made of whether the event risk rating is greater than eighty. If such is the case then data flow is denied. The method concludes at step 510.

The above actions described that may be taken in response to determination of event risk rating 328 are provided only for example purposes, and other actions may be taken without departing from the scope of the present invention.

Thus, according to the teachings of the invention factors other than simply the potential severity of a given signature are utilized in assigning a risk rating to a particular event. This allows more appropriate and particularized response to intrusion detection events and helps account for the possibility of false alarms and the allocation of scarce resources for addressing attacks on a computer system.

Although the present invention is described with several embodiments, a myriad of changes, variations, alterations, transformations, and modifications may be suggested to one skilled in the art, and it is intended that the present invention encompass such changes, variations, alterations, transformations, and modifications as they fall within the scope of the appended claims.

What is claimed is:

1. A computerized method for addressing intrusion attacks directed at a computer, the method comprising:
   receiving at least one packet corresponding to a potential attack on the computer;
   calculating a risk rating for the potential attack by:
      determining an attack severity rating indicative of the potential severity of the potential attack by comparing the type of potential attack to stored information having a plurality of attacks with corresponding predetermined numerical attack severity ratings;
      determining a signature fidelity rating indicative of the likelihood the potential attack will affect the computer in the absence of knowledge regarding the computer by comparing the type of potential attack to stored information having a plurality of attacks with corresponding predetermined numerical signature fidelity ratings;
      determining an attack relevance rating indicative of the relevance of the potential attack to the computer based on an operating system of the computer, a service availability of the computer, an application running at a service port of the computer, and the version of the application;
      determining a target value rating indicative of the perceived value of the computer;
      calculating the risk rating as a function of the attack severity rating, the signature fidelity rating, the attack relevance rating, and the target value rating, wherein the function is:

ERR=floor(((ASR)*(SFR)*(ARR)*(TVR))/1000000, 100) where:

ERR=the risk rating;
   ASR=the attack severity rating;
   SFR=the signature fidelity rating;
   ARR=the attack relevance rating; and
   TVR=the target value rating; and
   responding to the attack based on the risk rating.

2. The computerized method of claim 1, wherein the corresponding predetermined numerical attack severity ratings are selected from the group consisting of the numbers 25, 50, 75, and 100.

3. The computerized method of claim 1, wherein the corresponding predetermined numerical signature fidelity ratings are based on at least one of the factors selected from the group consisting of: the operating system of the computer; the service availability, the service application, and the version.

4. The computerized method of claim 1, wherein the attack relevance rating has a value ranging from 77 to 127.

5. The computerized method of claim 1, wherein the target value rating is selected from the group consisting of 90, 95, 100, 105, and 110.

6. The computerized method of claim 1, wherein responding to the attack based on the risk rating comprises at least one of the actions selected from the group consisting of:
   providing an alert if the risk rating exceeds a first particular value;
   logging the at least one packet if the risk rating exceeds a second particular value; and
   denying data flow to the computer if the risk rating exceeds a third particular value.

7. The computerized method of claim 1, wherein responding to the attack based on the risk rating comprises performing one of a plurality of sets of actions based on the risk rating.

8. A computerized method for addressing intrusion attacks directed at a computer, the method comprising:
   receiving at least one packet corresponding to a potential attack on the computer;
   calculating a risk rating for the potential attack by:
      determining an attack severity rating indicative of the potential severity of the potential attack;
      determining a signature fidelity rating indicative of the likelihood the potential attack will affect the computer in the absence of knowledge regarding the computer;
      determining an attack relevance rating indicative of the relevance of the potential attack to the computer;
      determining a target value rating indicative of the perceived value of the computer; and
      calculating the risk rating as a function of the attack severity rating, the signature fidelity rating, the attack relevance rating, and the target value rating; and
   responding to the potential attack based on the calculated risk rating.

9. The computerized method of claim 8, wherein determining an attack severity rating indicative of the potential severity of the potential attack comprises comparing the type of potential attack to stored information having a plurality of attacks with corresponding predetermined numerical attack severity ratings.

10. The computerized method of claim 8, wherein determining a signature fidelity rating indicative of the likelihood the potential attack will affect the computer in the absence of knowledge regarding the computer comprises comparing the type of potential attack to stored information having a plurality of attacks with corresponding predetermined numerical signature fidelity ratings.

11. The computerized method of claim 8, wherein determining an attack relevance rating indicative of the relevance of the potential attack to the computer comprises determining the attack relevance rating based on an operating system of the computer, a service availability of the computer, an application running at the service port of the computer, and the version of the application.

12. The computerized method of claim 8, wherein the function is:

$$ERR=\text{floor}(((ASR)*(SFR)*(ALRR)*(TVR))/1000000,100) \text{ where:}$$

ERR=the risk rating;
ASR=the attack severity rating;
SFR=the signature fidelity rating;
ARR=the attack relevance rating; and
TVR=the target value rating.

13. The computerized method of claim 8, wherein responding to the attack based on the risk rating comprises performing one of a plurality of sets of actions based on the risk rating.

14. A computerized method for addressing intrusion attacks directed at a computer, the method comprising:
receiving a data stream corresponding to a potential attack on the computer;
calculating a risk rating for the potential attack by:
determining a signature fidelity rating indicative of the likelihood the potential attack will affect the computer in the absence of knowledge regarding the computer,
determining at least one component risk rating selected from the group consisting of:
an attack relevance rating indicative of the relevance of the potential attack to the computer, and
a target value rating indicative of the perceived value of the computer; and
calculating the risk rating based on the signature fidelity rating and at least one of the component risk ratings; and
responding to the potential attack based on the calculated risk rating.

15. The method of claim 14, and further comprising determining an attack severity rating indicative of the potential severity of the potential attack and wherein calculating the risk rating comprises calculating the risk rating based on the at least one component risk rating, on the signature fidelity rating, and on the attack severity rating.

16. The method of claim 14, wherein determining at least one component risk rating comprises determining the attack relevance rating and the target value.

17. The method of claim 16, wherein calculating the risk rating based on the signature fidelity rating and at least one of the component risk rating comprises wherein calculating the risk rating based on the signature fidelity rating, the attack relevance rating, and the target value.

18. The computerized method of claim 16, and further comprising determining an attack severity rating indicative of the potential severity of the potential attack and wherein the risk rating is calculated according to the formula:

$$ERR=\text{floor}(((ASR)*(SFR)*(ALRR)*(TVR))/1000000,100) \text{ where:}$$

ERR=the risk rating;
ASR=the attack severity rating;
SFR=the signature fidelity rating;
ARR=the attack relevance rating; and
TVR=the target value rating.

19. The computerized method of claim 14, wherein responding to the attack based on the risk rating comprises performing one of a plurality of sets of actions based on the risk rating.

20. A system for addressing intrusion attacks directed at a computer, the system comprising:
a software program embodied in a computer readable storage medium, the software program, when executed by a processor, operable to:
calculate a risk rating for a data stream received by the system embodying a potential attack by:
determining a signature fidelity rating indicative of the likelihood the potential attack will affect the computer in the absence of knowledge regarding the computer,
determining at least one component risk rating selected from the group consisting of:
an attack relevance rating indicative of the relevance of the potential attack to the computer, and
a target value rating indicative of the perceived value of the computer; and
calculate the risk rating based on the signature fidelity rating and at least one of the component risk ratings; and
initiate a response to the potential attack based on the risk rating.

21. The system of claim 20, and wherein the software program is further operable to determine an attack severity rating indicative of the potential severity of the potential attack and calculate the risk rating based at least on the at least one component risk rating, on the signature fidelity rating, and on the attack severity rating.

22. The method of claim 20, wherein the software program is further operable to calculate the risk rating based on the signature fidelity rating, the attack relevance rating, and the target value.

23. The system of claim 22, wherein the software program is further operable to determine the risk rating according to the formula:

$$ERR=\text{floor}(((ASR)*(SFR)*(ALRR)*(TVR))/1000000,100) \text{ where:}$$

ERR=the risk rating;
ASR=the attack severity rating;
SFR=the signature fidelity rating;
ARR=the attack relevance rating; and
TVR=the target value rating.

24. The system of claim 20, wherein the computer program is further operable to perform one of a plurality of sets of actions based on the risk rating.

25. A system for addressing intrusion attacks directed at a computer, the system comprising:
means for receiving at least one packet corresponding to a potential attack on the computer;
means for calculating a risk rating for the at least one packet by:

determining an attack severity rating indicative of the potential severity of the potential attack;
determining a signature fidelity rating indicative of the likelihood the potential attack will affect the computer in the absence of knowledge regarding the computer;
determining an attack relevance rating indicative of the relevance of the potential attack to the computer;
determining a target value rating indicative of the perceived value of the computer; and
calculating the risk rating as a function of the attack severity rating, the signature fidelity rating, the attack relevance rating, and the target value rating; and
means for responding to the potential attack based on the calculated risk rating;
wherein the means for calculating a risk comprises software embodied in a computer readable storage medium and an associated processor for executing the software.

* * * * *